US010543918B1

(12) United States Patent
Kimchi et al.

(10) Patent No.: US 10,543,918 B1
(45) Date of Patent: Jan. 28, 2020

(54) AERIAL VEHICLE ASSEMBLY CONFIGURATIONS

(71) Applicant: Amazon Technologies, Inc., Seattle, WA (US)

(72) Inventors: Gur Kimchi, Bellevue, WA (US); Fabian Thomas Hensel, Seattle, WA (US); Scott A. Green, North Bend, WA (US); Daniel Buchmueller, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 373 days.

(21) Appl. No.: 15/618,044

(22) Filed: Jun. 8, 2017

Related U.S. Application Data

(63) Continuation of application No. 14/315,222, filed on Jun. 25, 2014, now Pat. No. 9,764,835.

(60) Provisional application No. 61/974,344, filed on Apr. 2, 2014.

(51) Int. Cl.
*B64C 39/02* (2006.01)

(52) U.S. Cl.
CPC ...... *B64C 39/024* (2013.01); *B64C 2201/024* (2013.01); *B64C 2201/108* (2013.01)

(58) Field of Classification Search
CPC ............ B64C 39/024; B64C 2201/108; B64C 2201/024
See application file for complete search history.

(56) References Cited

U.S. PATENT DOCUMENTS

| | | | |
|---|---|---|---|
| 8,453,962 B2 * | 6/2013 | Shaw | B64C 27/20 244/12.4 |
| 9,061,763 B1 * | 6/2015 | Christensen | A63H 17/28 |
| 9,902,491 B2 * | 2/2018 | Chan | B64C 27/08 |
| 9,914,537 B2 * | 3/2018 | Wu | B64C 27/08 |
| 10,086,931 B2 * | 10/2018 | Reichert | B64C 29/0025 |
| 10,183,747 B1 * | 1/2019 | Longhi | B64C 31/028 |
| 10,322,799 B2 * | 6/2019 | McCullough | B64C 29/02 |
| 2009/0008499 A1 * | 1/2009 | Shaw | B64C 27/20 244/17.23 |
| 2014/0263823 A1 * | 9/2014 | Wang | B64C 39/028 244/17.23 |
| 2015/0012154 A1 * | 1/2015 | Senkel | B64D 17/80 701/4 |
| 2015/0344136 A1 * | 12/2015 | Dahlstrom | B64C 39/024 701/3 |
| 2016/0016664 A1 * | 1/2016 | Basuni | B64C 39/024 244/17.13 |
| 2016/0023755 A1 * | 1/2016 | Elshafei | G08G 5/025 244/17.13 |
| 2016/0059958 A1 * | 3/2016 | Kvitnevskiy | B64C 27/52 701/3 |
| 2016/0122017 A1 * | 5/2016 | Welker | B64C 39/024 244/17.23 |
| 2016/0144954 A1 * | 5/2016 | Daigle | B64C 39/024 244/17.23 |
| 2016/0185454 A1 * | 6/2016 | Hutson | B64C 39/024 244/17.23 |
| 2016/0257400 A1 * | 9/2016 | Olm | B60F 5/02 |
| 2016/0272316 A1 * | 9/2016 | Nelson | B64C 39/024 |

* cited by examiner

*Primary Examiner* — Valentina Xavier
(74) *Attorney, Agent, or Firm* — Athorus, PLLC (57) ABSTRACT

This disclosure describes a configuration of a multi-propeller aerial vehicle (MPAV). The components of the MPAV are designed for easy manufacture, assembly, configuration and replacement. Likewise, the configuration of the MPAV is designed for increased flight duration.

20 Claims, 8 Drawing Sheets

AERIAL VEHICLE ASSEMBLY CONFIGURATIONS

CROSS-REFERENCE TO RELATED APPLICATIONS

This application is a Continuation of U.S. application Ser. No. 14/315,222, filed Jun. 25, 2014, which claims priority to U.S. Provisional Application No. 61/974,344, filed Apr. 2, 2014, entitled "Aerial Vehicle Configuration," the contents of which are incorporated by reference herein in their entirety.

BACKGROUND

Multi-propeller aerial vehicles (e.g., quad-copters, octo-copters) are becoming more common. All such vehicles require a body configuration that will support the separation of the multiple propellers, the control components, the power supply (e.g., battery), etc. However, there is a balance between weight and duration of flight. As the weight increases, for example to support more components, the flight duration will decrease.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a configuration of a multi-propeller aerial vehicle ("MPAV") and universal attachment members for the efficient fabrication and assembly thereof. As discussed further below, the MPAV has been designed for extended flight duration, universal assembly and replacement of parts.

In one implementation, the support arms, the extension arms and the motor arms may be carbon fiber and the universal Y attachment member, that is used to connect each of the arms and the core, may be machined aluminum. In other implementations, one or more of the components of the core, the arms and/or the Y attachment member may be graphite, aluminum, carbon fiber, steel, titanium, plastic, or any other material.

Regardless of material, the Y attachment member may be designed for universal use at each junction between any of the support arms, the extension arms and/or the motor arms. Likewise, each of the support arms, extension arms, motor arms and attachment members may be hollow, thereby reducing weight and providing a cavity through which one or more wires and/or cables may be passed. For example, wires that connect the propeller motors to components located at the core (e.g., electronic speed control ("ESC")) may be passed through the inner portion of one or more of the support arms, extension arms and/or motor arms.

In some implementations, the MPAV assembly may be configured so that the wires passing through the extension arms and/or the motor arms have multiple junctions to enable easy disassembly and/or part replacements. For example, the motor wires may be configured with multiple separable junctions. For example, the motor wires may extend from the motor and have a separable junction at or near the distal end of the motor arm near where the motor is mounted, rather than having only a single junction where the motor wires connect to the ESC mounted at the core. By having a separable junction for the motor wires near the motor, the motor can be easily removed and replaced without having to disassemble any other components (e.g., core, extension arms, motor arms) of the MPAV.

Figure 1A:
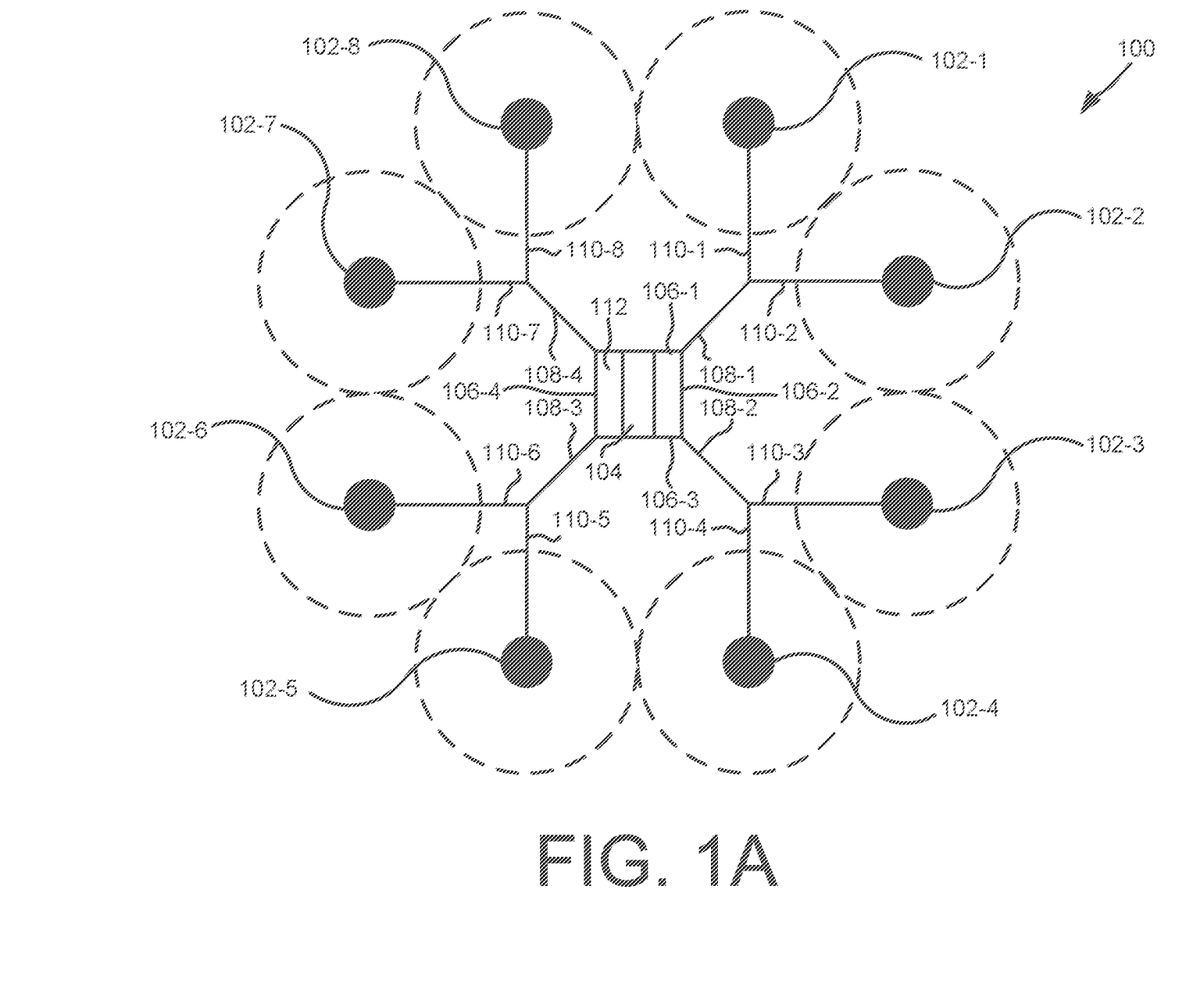
FIG. 1A depicts a block diagram of a top-down view of a multi-propeller aerial vehicle, according to an implementation.

FIG. 1A depicts a block diagram of a top-down view of a MPAV 100, according to an implementation. As illustrated, the MPAV 100 is configured to support eight motors 102-1, 102-2, 102-3, 102-4, 102-5, 102-6, 102-7, 102-8. Each of the motors 102 may be configured to rotate one or more propellers to enable flight of the MPAV. In the illustrated implementation, the propellers may be up to 30 inches in diameter, as illustrated by the dashed circles around each motor 102.

The MPAV 100 is symmetrically designed from the core outward to enable easy manufacture of MPAV 100 parts and for ease of assembly and/or disassembly. Turning first to the core 104, the core may include four support arms 106-1, 106-2, 106-3, 106-4, connected at 90 degree angles using the two 90 degree connection points of the Y attachment members, as discussed further below with respect to FIGS. 2, 3, and 4. Extending from the third connection point of each Y attachment member that is used to connect the support arms 106 of the core is an extension arm 108-1, 108-2, 108-3, 108-4. Because of the configuration of the universal Y attachment members, each extension arm is extending from the core 104 at a one hundred thirty-five (135) degree angle from the support arms 106.

Connected to the opposing end of each extension arm, using the universal Y attachment member, are two motor arms 110-1, 110-2, 110-3, 110-4, 110-5, 110-6, 110-7, 110-8. To enable connection of the motor arms, the third connection point of the universal Y attachment member is connected with the end of the extension arm 108 such that the two connection points of the universal Y attachment member that are at ninety (90) degrees extend outward from the extension arm 108. Mounting the motor arms 110 to the two ninety (90) degree connection points extending from each extension arm 108 results in the configuration illustrated in FIG. 1A.

The motors 102 are connected to the protruding end of each of the motor arms 110, as illustrated. The motors 102 may be any form of motor capable of generating enough speed with the propellers to lift the MPAV 100 and any engaged inventory thereby enabling aerial transport of the inventory. For example, the motors 102 may each be a Lumeneir FX-4006-13 740 kv multi rotor motors.

As noted above, the material of the support arms 106, the extension arms 108, and the motor arms 110 may be any suitable material, such as graphite, aluminum, carbon fiber, steel, titanium, plastic, or any other material. The cross-sectional shape of the arms 106, 108, 110 and/or the universal Y attachment members 200 may be square, round, rectangular, hexagonal, etc. For example, referring briefly to FIG. 6, the motor arm 110 is illustrated as having a square cross-sectional shape. By fabricating the universal Y attachment member to have a slightly smaller cross-sectional shape than that of the arms 106, 108, 110, the attachment points of the universal Y attachment member can fit inside the arms and be affixed using screws, bolts, or other attachment mechanisms, as discussed herein.

In some implementations, to enable sufficient separation for use of thirty inch (30") propellers, each of the support arms 106 may be ten inches (10") in length, each of the extension arms 108 may be twelve and one-half inches (12.5") in length, and each of the motor arms 110 may be twenty-one and one-half inches in length (21.5"). In other implementations, other lengths of any one of the support arms 106, extension arms 108 and/or motor arms 110 may be utilized. In addition, alternative methods of propulsion may be utilized. For example, fans, jets, turbojet, turbo fans, jet engines, and the like may be used to propel the MPAV.

While the implementation illustrated in FIG. 1A includes a square core 104, four extension arms 108 extending from the corners of the core 104, and eight motor arms 110 connected to the extension arms 108, in other implementations, there may be fewer or more arms and/or the arms may have different shapes. For example, the core 104 may be a rectangular configuration with extension arms extending from each corner. In another implementation, the core 104 may be a hexagonal shape with extension arms 108 extending from each of the six corners and two motor arms extending from each of the six extension arms, thereby enabling the use of up to twelve motors and propellers. In other implementations, rather than including extension arms, motor arms and motors at each corner of a hexagonal core, only four extension arms and motors may be utilized, resulting in up to eight motor arms and motors. The other two corners of the hexagonal core may be used to mount other components, such as a gimbal, payload carrier, etc.

In a hexagonal core configuration, the universal Y attachment member may be machined such that each of the three connection points are at 120 degree angles with respect to each other.

In still other implementations, rather than connecting two motor arms to each extension arm, a motor may be mounted onto the protruding end of the extension arm. In a configuration with four extension arms, such as that illustrated in FIG. 1B the MPAV would be a quad-copter, which four motors. In a hexagon configuration, the MPAV would be a hexa-copter, with six motors. Other configurations are also possible.

Regardless of the core 104 configuration, the support arms 106, when joined to form the core 104, create an interior, referred to herein as the core cavity 112. The core cavity 112 may be configured to support the MPAV 100 control system, such as the MPAV control system discussed below with respect to FIG. 7, a payload carrier, a gimbal, etc. The core 104 and core cavity 112 are discussed in further detail below with respect to FIG. 3.

Figure 1B:
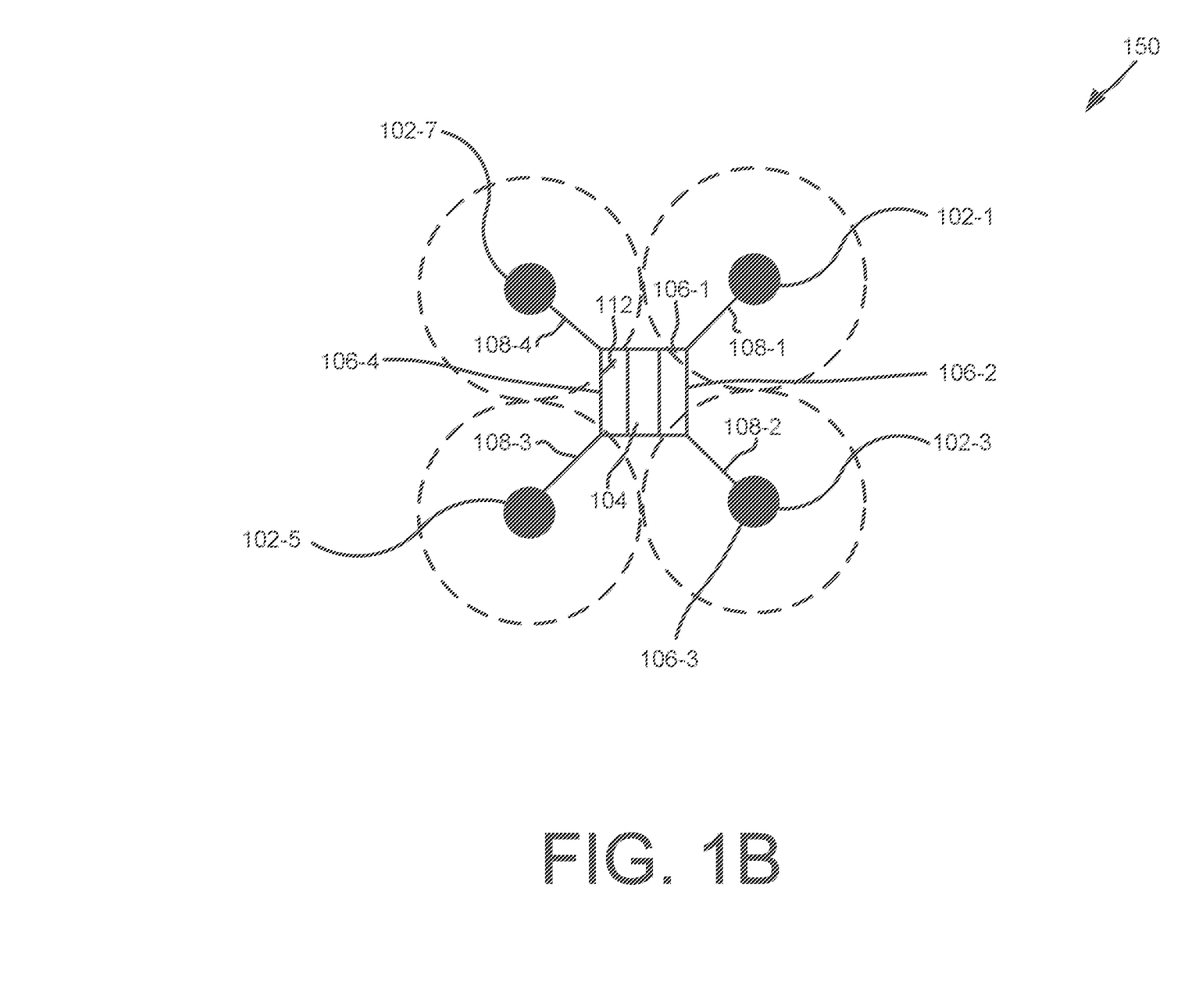
FIG. 1B depicts a block diagram of another top-down view of a multi-propeller aerial vehicle, according to an implementation.

FIG. 1B depicts a block diagram of another top-down view of a multi-propeller aerial vehicle 150, according to an implementation. As illustrated, the MPAV 150 is configured to support four motors 102-1, 102-3, 102-5, 102-7. Each of the motors 102 may be configured to rotate one or more propellers to enable flight of the MPAV 150. In the illustrated implementation, the propellers may be up to 30 inches in diameter, as illustrated by the dashed circles around each motor 102.

Similar to the MPAV 100 discussed with respect to FIG. 1A, the MPAV 150 is symmetrically designed from the core outward to enable easy manufacture of MPAV 150 parts and for ease of assembly and/or disassembly. For example, the core 104 may include four support arms 106-1, 106-2, 106-3, 106-4, connected at 90 degree angles using the two 90 degree connection points of the Y attachment members, as discussed further below with respect to FIGS. 2, 3, and 4. Extending from the third connection point of each Y attachment member that is used to connect the support arms 106 of the core is an extension arm 108-1, 108-2, 108-3, 108-4. As discussed above, because of the configuration of the universal Y attachment members, each extension arm is extending from the core 104 at a one hundred thirty-five (135) degree angle from the support arms 106.

In this implementation, there are no motor arms connected to the extension arms 108. In this implementation, connected at the opposing end of each extension arm 108 are motors 102.

Figure 2:
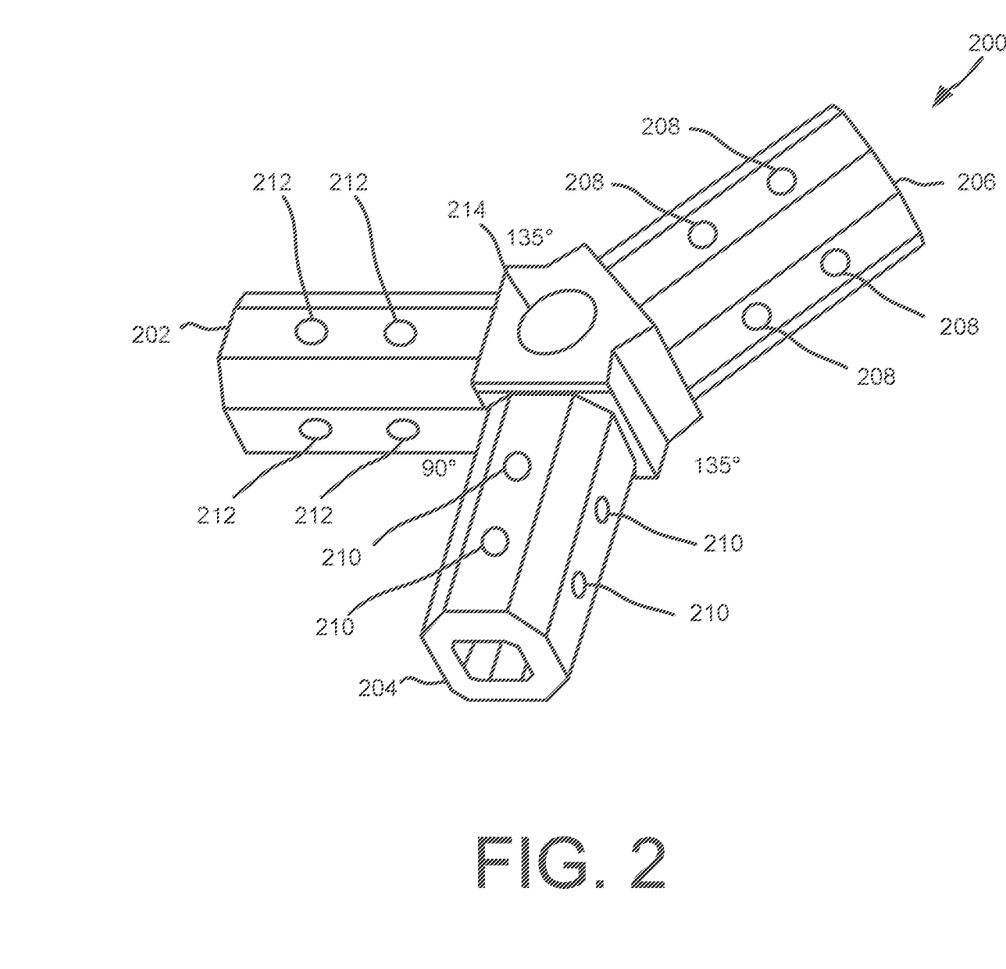
FIG. 2 depicts a diagram of universal Y attachment member, according to an implementation.

As noted above, the material of the support arms 106, and the extension arms 108 may be any suitable material, such as graphite, aluminum, carbon fiber, steel, titanium, plastic, or any other material. The cross-sectional shape of the arms 106, 108 and/or the universal Y attachment members 200 may be square, round, rectangular, hexagonal, etc. For example, referring briefly to FIG. 6, the motor arm 110 is illustrated as having a square cross-sectional shape. By fabricating the universal Y attachment member to have a slightly smaller cross-sectional shape than that of the arms 106, 108, 110, the attachment points of the universal Y attachment member can fit inside the arms and be affixed using screws, bolts, or other attachment mechanisms, as discussed herein. FIG. 2 depicts a diagram of universal Y attachment member 200, according to an implementation. As discussed above, the universal Y attachment member 200 may be utilized to connect each of the support arms, extension arms, and/or motor arms. In one implementation, the first connection point 202 and the second connection point 204 are positioned at ninety degrees with respect to each other. The third connection point 206 is positioned at 135 degrees from each of the first connection point 202 and the second connection point 204.

As discussed above, the universal Y attachment member 200 may be made from any suitable material such as, but not limited to, graphite, aluminum, carbon fiber, steel, titanium, plastic, etc. Likewise, the universal Y attachment member 200 may be hollow to allow passage of wires through the universal Y attachment member 200.

In some implementations, the universal Y attachment member 200 may be configured such that each connection point 202, 204, 206 will fit inside of an arm that is connected to the universal Y attachment member. In some implementations, the joinder of the arms and the universal Y attachment member 200 may be friction fit. For example, if the arms and the universal Y attachment member 200 both have a square cross-sectional shape, the cross-sectional dimensions of the connection points 202, 204, 206 of the universal Y attachment member 200 may be slightly smaller than the cross-sectional dimensions of the arms, thereby allowing the connection points 202, 204, 206 of the universal Y attachment member 200 to be inserted into the arms. In other implementations, the cross sectional dimensions may be inverted, with the cross-sectional dimensions of the arms being slightly smaller than the cross-sectional dimensions of the connection points of the universal Y attachment member 200.

In some implementations, each of the connection points 202, 204, 206 may include one or more holes 208, 210, 212 for receiving screws and/or bolts that are used to secure the arms to the connection points. For example, the holes 208 may pass through both sides of the connection point 206 so that an arm can be affixed to the connection point by passing bolts through the holes in the arm (not shown), the holes 208 in the connection point 206 and securing the bolt with a nut. In other implementations, the holes may be threaded for receiving screws and may only be on one side of the connection point of the universal Y attachment member 200. For example, an arm may be positioned on a connection point 206 and a screw positioned through each hole in the arm (not show) and threaded into the holes 208 to secure the arm to the universal Y attachment member 200. In still other implementations, other forms of connections may be utilized to secure arms to the connection points of the universal Y attachment member 200.

In some implementations, a center hole 214 may also be formed in the approximate center of the universal Y attachment member 200. The center hole 214 may be configured to receive other members, such as landing gear for use in landing or supporting the MPAV 100 when not in flight.

Figure 3:
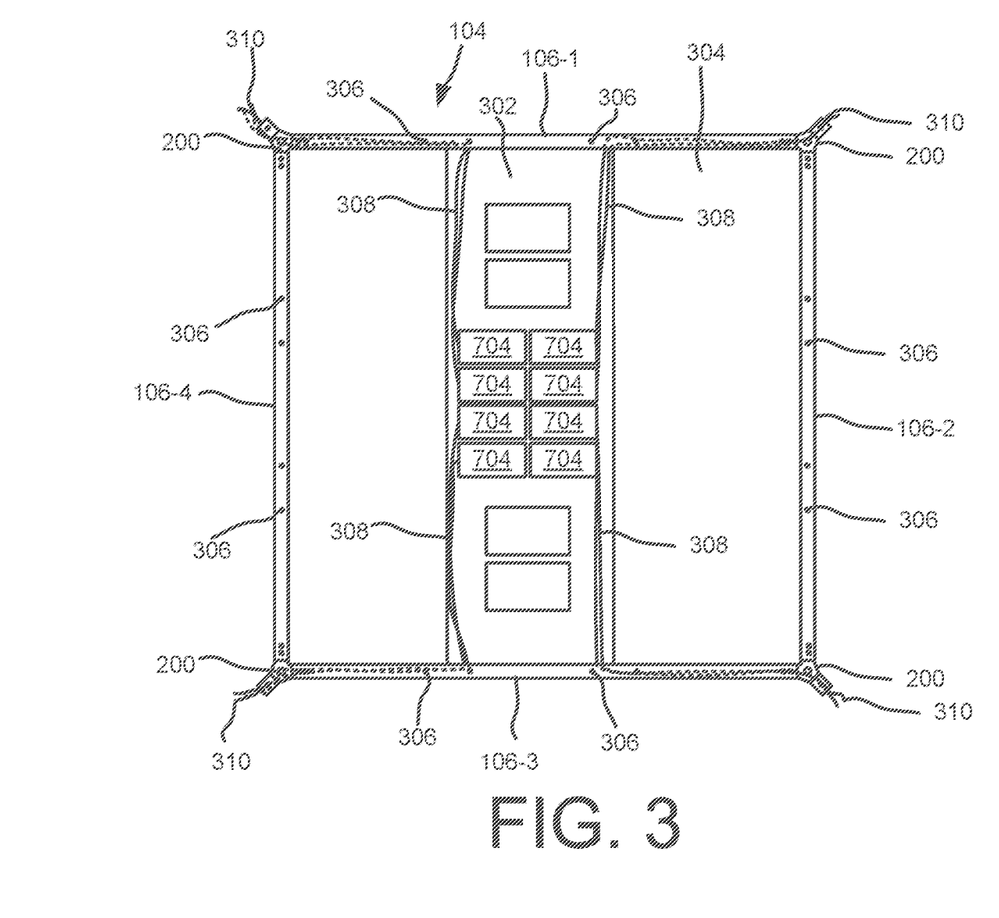
FIG. 3 depicts a block diagram of a top-down view of a core of a multi-propeller aerial vehicle, such as the multi-propeller aerial vehicle of FIGS. 1A-1B, according to an implementation.

FIG. 3 depicts a block diagram of a top-down view of a core 104 of a MPAV, such as the MPAV 100 of FIG. 1A and/or FIG. 1B, according to an implementation. As discussed above, in this example, the core is square and formed by four support arms 106-1, 106-2, 106-3, 106-4 that are joined together by connecting each end of the support arms to a first or second connection point of the universal Y attachment member 200.

As illustrated in FIG. 3, a mounting plate 302 is attached to two of the support arms 106-1, 106-2 and configured to provide additional structural support to the MPAV 100 and hold the MPAV control system 304 components. The mounting plate 302 may be of any suitable material including, but not limited to, graphite, aluminum, carbon fiber, steel, titanium, plastic, etc.

In this example, the mounting plate 302 is the same length as the core 104 and approximately one-third the width. Accordingly, the mounting plate may be positioned at multiple different positions within the core of the MPAV 100 and/or multiple mounting plates may be utilized together.

As illustrated, a single mounting plate is positioned in the center of the MPAV core 104. In other implementations, the mounting plate may be positioned to the right or left of where the mounting plate 302 is positioned in FIG. 3.

To provide flexibility in mounting options, each of the support arms 106 may include predrilled holes 306 that may be used to attach the mounting plate to the MPAV 100 (e.g., using screws, bolts, etc.). In some implementations, the holes 306 may only be included on one side of the support arm 106. In other implementations, the holes 306 may be on both sides of the support arm. In such an implementation, mounting plates 302 may be affixed to either or both sides of the support arms. For example, a mounting plate may be affixed to the lower side of the support arms 106 and the control system 304 affixed to the mounting plate and positioned within the core cavity. A second mounting plate may then be affixed to the upper side of the support arms 106 to effectively cover the control system 304 components.

In this example, the MPAV control system 304 is mounted on the mounting plate 302. The MPAV control system 304, as discussed in further detail below with respect to FIG. 7, controls the operation, routing, navigation, etc., of the MPAV 100. Likewise, the mounting plate may also support one or more power supplies (not shown). The power supply for the MPAV may be in the form of battery power, solar power, gas power, or a combination thereof. For example, the power supplies may each be a Lumenier 3300 mAh 4s 35c lipo battery. The power supply(s) are coupled to and provide power for the MPAV control system 304 and the motors 102.

As illustrated in FIG. 3, the motor wires 308 may extend from each of the ESCs 704 that are used to control each motor 102 (FIGS. 1A, 1B). The wires 308 may be routed through one or more of the holes 306 included on the support arms (or different holes formed in the support arms), passed through the interior of the support arms and through the interior of the universal Y attachment members 200, as illustrated by the dashed lines. As illustrated, the wires 308 may include wire junctions 310 near the universal Y attachment members to facilitate easy attachment and/or detachment of extension arms from the core 104. The wire junctions 310 may be any form of connectors that enable connection of two wires. For example, one wire junction may be configured with male connectors and a mating wire junction may be configured with female connectors. In some implementations, wire junctions 310 may exist at every universal Y attachment member 200 to enable separation of the arms connected to that member and any wires that pass through the universal Y attachment member 200.

The MPAV 100 may also include a payload engagement mechanism (not shown) that is mounted to the mounting plate 302, the support arms, the extension arms and/or the motor arms. The payload engagement mechanism may be configured to engage and disengage payload, such as items, packages, cameras, etc.

Figure 4:
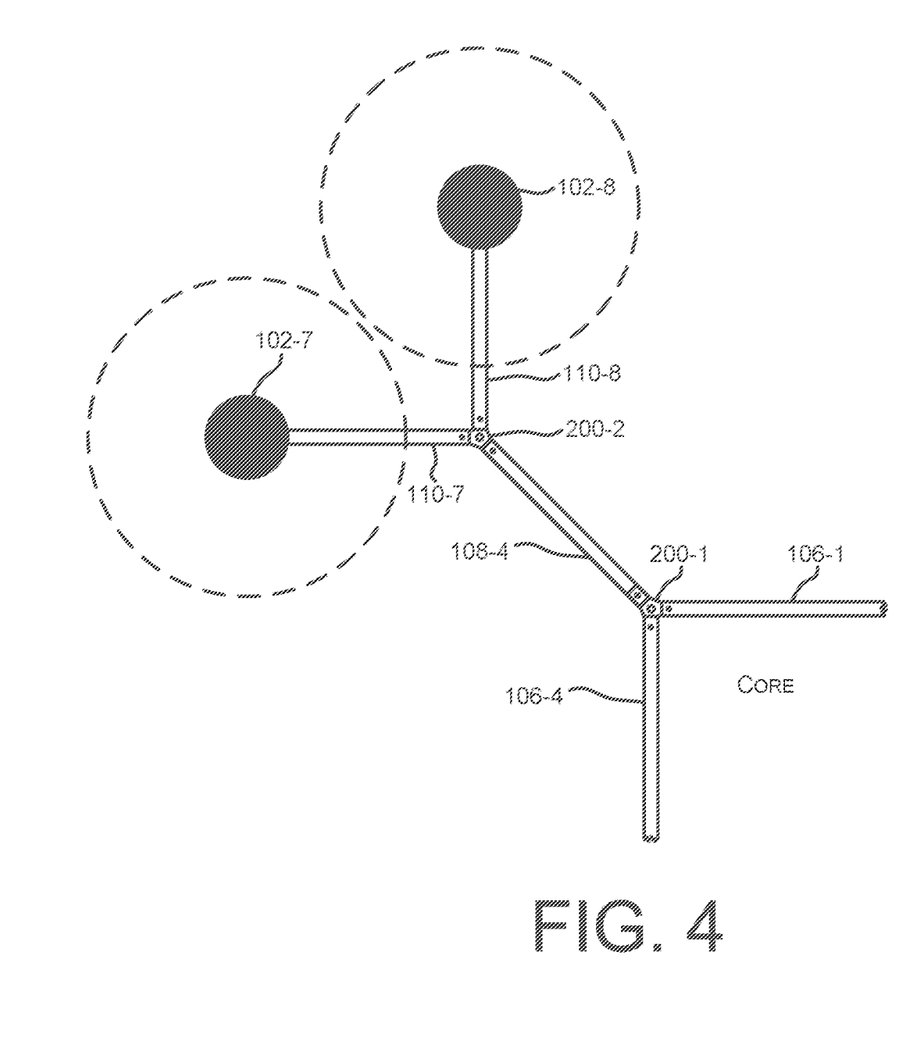
FIG. 4 depicts a block diagram of universal Y attachment members connecting two motor arms, an extension arm, and support arms that make up part of a MPAV, such as the MPAV illustrated in FIGS. 1A and/or 1B, according to an implementation.

FIG. 4 depicts a block diagram of universal Y attachment members 200 connecting two motor arms 110-7, 110-8, an extension arm 108-4, and support arms 106-1, 106-4 that make up part of a MPAV, such as the MPAV illustrated in FIG. 1A and/or FIG. 1B, according to an implementation. As illustrated, a first universal Y attachment member 200-1 is used in a first position to join the two support arms 106-1, 106-4 at a ninety (90) degree angle. Likewise, one end of the extension arm 108-4 is attached to the first universal Y attachment member 200-1 and extends away from the two support arms at a one hundred and thirty-five (135) degree angle.

On the opposing end of the extension arm 108-4, a second universal Y attachment member 200-2 is mounted in an inverted direction with respect to the first universal Y attachment member 200-1. Attached to the two other connection points of the second universal Y attachment member 200-2 are two motor arms 110-7, 110-8. By inverting the orientation of the second universal Y attachment member 200-2, the two motor arms 110-7, 110-8 extend and form a ninety (90) degree angle between each other. This configuration may be done for each corner of the core 104 and for each junction of motor arms 110 to form the MPAV discussed above with respect to FIG. 1A and/or FIG. 1B. Likewise, the wires for the motors may pass through the interior of one or more of the support arms 106, through the interior of the first universal Y attachment member 200-1, through the interior of the extension arm 108-4, through the interior of the second universal Y attachment member 200-2, and/or through each respective motor arm 110.

Likewise, in some implementations, a wire junction for connecting and/or disconnecting the wires may exist at the first universal Y attachment member 200-1, the second universal Y attachment member 200-2 and/or at the end of each motor arm 110. The wire junctions allow for easy disassembly and parts replacement without having to dismantle additional parts of the MPAV. For example, a motor can be easily replaced by simply disconnecting the motor wires from a wire junction at the end of the motor arm 110.

In some implementations, the wires may have sufficient slack to allow separation of the different arms from the universal Y attachment members 200 without having to disconnect the wires. For example, the motor arms and/or the extension arms may be disconnected from the respective universal Y attachment members 200 to allow compaction of the MPAV for storage and/or transport.

Figure 5A:
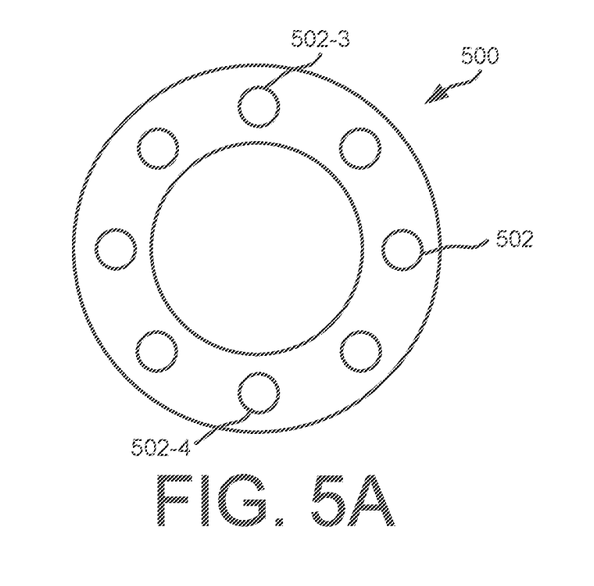
FIGS. 5A-5B depict block diagrams of motor assembly members for connecting a motor to a motor arm, according to an implementation.
Figure 5B:
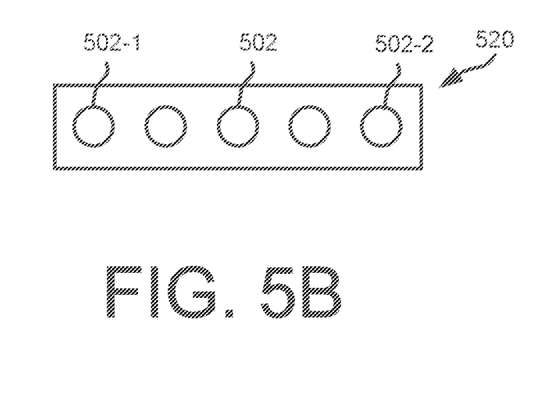

FIGS. 5A-5B depict block diagrams of motor assembly members for connecting a motor 102 to a motor arm 110, according to an implementation. The motor assembly members may be any suitable material, including, but not limited to graphite, aluminum, carbon fiber, steel, titanium, plastic, etc. FIG. 5A illustrates the upper mounting plate 500 that is configured to be positioned outside a motor arm 110 and attach to the bottom of a motor 102. FIG. 5B illustrates a lower mounting plate 520 that is configured to be positioned inside a motor arm 110. Each of the upper mounting plate and the lower mounting plate may include one or more holes 502. The holes may be threaded to receive one or more screws. Alternatively, the holes may not be threaded. In some implementations, two of the holes of the lower mounting plate 520, such as the exterior holes 502-1, 502-2 may have a same distance of separation as two of the holes of the upper mounting plate, such as holes 502-3, 502-4. Likewise, the holes of the upper mounting plate may have the same positioning as the mounting holes of the motor 102.

Figure 6:
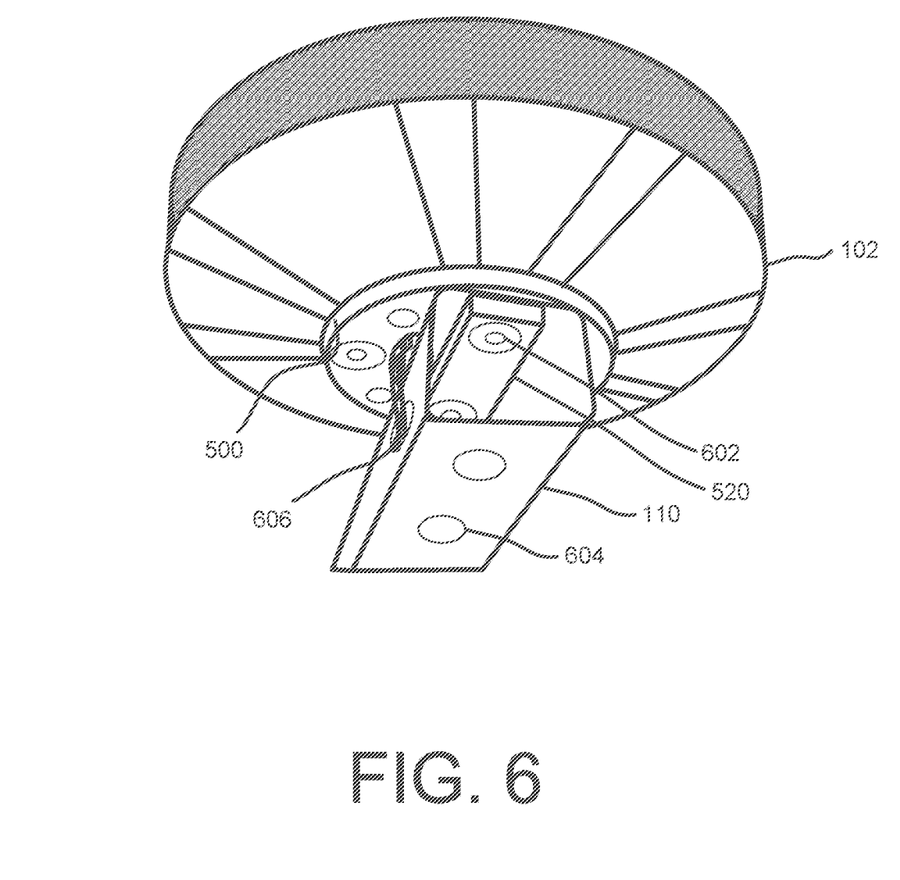
FIG. 6 depicts a diagram of the motor assembly members connecting a motor to a motor arm, according to an implementation.

In some implementations, the upper mounting plate 500 and the lower mounting plate 520 may be aluminum and configured to be positioned to mount the motor to the motor arm 110, as illustrated in FIG. 6. Specifically, FIG. 6 depicts a diagram of the upper mounting plate 500 and the lower mounting plate 520 positioned to mount a motor 102 to the motor arm 110, according to an implementation. In implementations where the motor arm 110 is carbon fiber, utilizing the lower mounting plate 520 and the upper mounting plate 500 to mount the motor 102 to the motor arm 110 allows the pressure resulting from the mounting to be distributed over a larger portion of the motor arm 110. For example, without the mounting plates 500, 520 the screws 602 used to affix the motor 102 to the motor arm 110 would be in direct contact with the motor arm 110 and all the pressure would be at the contact points between the screws 602 and the motor arm 110. This often results in damage to the carbon fiber of the motor arm. The inclusion of the lower mounting plate 520 and the upper mounting plate 500 distributes the pressure thereby reducing or eliminating damage to the motor arm 110. The lower mounting plate 520 may be positioned inside the motor arm 110 and the upper mounting plate 500 may be positioned on top of the motor arm 110. Screws 602 may be passed through the lower mounting plate, the motor arm, the upper mounting plate and screwed into the motor 102 thereby mounting the motor onto the motor arm.

The holes 604 in the motor arm 110 may be on both sides of the motor arm 110 and have the same spacing as the holes in the upper mounting plate 500, lower mounting plate 520 and the motor 102. The holes on one side of the motor arm are aligned with the lower mounting plate 520, upper mounting plate 500 and the motor 102. The holes on the opposite side of the motor arm 110 may be used to access and affix the screws 602 to mount the motor 102 to the motor arm 110.

A wire access hole 606 may be included at the end of the motor arm that allows the wires to pass out of the motor arm 110 and into the motor 102. In other implementations, the wires may pass out of the end of the motor arm 110 and connect into the motor 102. As discussed above, a wire junction may be formed at or near the end of the motor arm 110 to enable easy connection and/or disconnection of the motor wires from the motor so that the motor can be easily replaced.

The holes 604 may be pre-formed in each end of the motor arm and used to either mount the motor, as illustrated in FIG. 6, or to attach the motor arm to a connection point of a universal Y attachment member 200.

Figure 7:
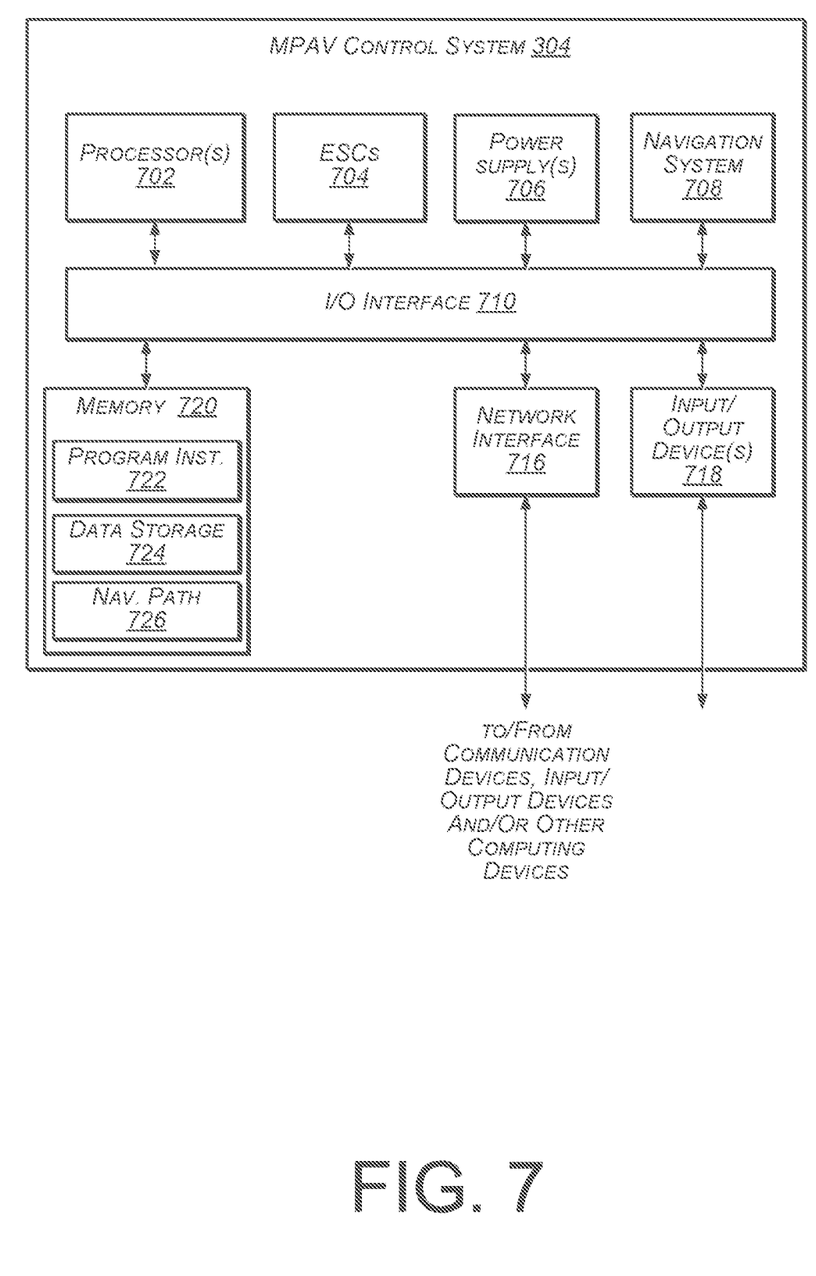
FIG. 7 is a block diagram of a multi-propeller aerial vehicle control system, according to an implementation.

FIG. 7 is a block diagram illustrating an example MPAV control system 304. In various examples, the block diagram may be illustrative of one or more aspects of the MPAV control system 304. In the illustrated implementation, the MPAV control system 304 includes one or more processors 702, coupled to a non-transitory computer readable storage medium 720 via an input/output (I/O) interface 710. The MPAV control system 304 may also include one or more ESCs 704, power supply 706 and/or a navigation system 708. The MPAV control system 304 may further include a network interface 716, and one or more input/output devices 718.

In various implementations, the MPAV control system 304 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, navigation paths and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, are shown stored within the non-transitory computer readable storage medium 720 as program instructions 722, data storage 724 and navigation path data 726, respectively. In other implementations, program instructions, data and/or navigation paths may be received, sent or stored upon different types of computer-accessible media, such as non-transitory media, or on similar media separate from the non-transitory computer readable storage medium 720 or the MPAV control system 304. Generally speaking, a non-transitory, computer readable storage medium may include storage media or memory media such as magnetic or optical media, e.g., disk or CD/DVD-ROM coupled to the MPAV control system 304 via the I/O interface 710. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface 716 or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The ESC 704 communicates with the navigation system 708 and adjusts the power of each motor to guide the MPAV along a determined navigation path and/or in response to navigation instructions. The navigation system 708 may include a global positioning system ("GPS") or other similar system than can be used to navigate the MPAV.

The network interface 716 may be configured to allow data to be exchanged between the MPAV control system 304, other devices attached to a network, such as other computer systems, and/or with MPAV control systems of other MPAVs. For example, the network interface 716 may enable wireless communication between numerous MPAVs. In various implementations, the network interface 716 may support communication via wireless general data networks, such as a Wi-Fi network. For example, the network interface 716 may support communication via telecommunications networks such as cellular communication networks, satellite networks, and the like.

Input/output devices 718 may, in some implementations, include one or more displays, image capture devices, thermal sensors, infrared sensors, time of flight sensors, accelerometers, pressure sensors, weather sensors, etc. Multiple input/output devices 718 may be present and controlled by the MPAV control system 304. One or more of these sensors may be utilized to assist in landing as well as obstacle avoidance. For example, utilizing a location signal from the GPS receiver and one or more IR sensors, the MPAV may safely land at a location. The IR sensors may be used to provide real-time data to assist the MPAV in avoiding moving/movable obstacles.

As shown in FIG. 7, the memory 720 may include program instructions 722 which may be configured to implement various processes and/or sub-processes. The data storage 724 may include various data stores for maintaining data items that may be provided for determining navigation paths, landing, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the MPAV control system 304 is merely illustrative and is not intended to limit the scope of the present disclosure. In particular, the computing system and devices may include any combination of hardware or software that can perform the indicated functions, including computers, network devices, internet appliances, PDAs, wireless phones, etc. The MPAV control system 304 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated MPAV control system 304. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from MPAV control system 304 may be transmitted to MPAV control system 304 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other MPAV control system configurations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An aerial vehicle, comprising:
   a first support arm, a second support arm, a third support arm, and a fourth support arm;
   a first extension arm, a second extension arm, a third extension arm, and a fourth extension arm;
   a first motor arm and a second motor arm; and
   wherein:
   a first end of the first support arm is attached with a first end of the second support arm, and a first end of the first extension arm;
   a second end of the second support arm is attached with a first end of the third support arm, and a first end of the second extension arm;
   a second end of the third support arm is attached with a first end of the fourth support arm, and a first end of the third extension arm;
   a second end of the fourth support arm is attached with a second end of the first support arm, and a first end of the fourth extension arm; and
   a second end of the first extension arm is attached with a first end of the first motor arm, and a first end of the second motor arm.

2. The aerial vehicle of claim 1, further comprising:
   a third motor arm, a fourth motor arm, a fifth motor arm, a sixth motor arm, a seventh motor arm, and an eighth motor arm; and
   wherein:
   a second end of the second extension arm is attached with a first end of the third motor arm, and a first end of the fourth motor arm;
   a second end of the third extension arm is attached with a first end of the fifth motor arm, and a first end of the sixth motor arm; and
   a second end of the fourth extension arm is attached with a first end of the seventh motor arm, and a first end of the eighth motor arm.

3. The aerial vehicle of claim 2, wherein:
   the first end of the first support arm is attached with the first end of the second support arm, and the first end of the first extension arm via a first attachment member;
   the second end of the second support arm is attached with the first end of the third support arm, and the first end of the second extension arm via a second attachment member;
   the second end of the third support arm is attached with the first end of the fourth support arm, and the first end of the third extension arm via a third attachment member; and
   the second end of the fourth support arm is attached with the second end of the first support arm, and the first end of the fourth extension arm via a fourth attachment member.

4. The aerial vehicle of claim 3, wherein:
   the second end of the first extension arm is attached with the first end of the first motor arm, and the first end of the second motor arm via a fifth attachment member;
   the second end of the second extension arm is attached with the first end of the third motor arm, and the first end of the fourth motor arm via a sixth attachment member;
   the second end of the third extension arm is attached with the first end of the fifth motor arm, and the first end of the sixth motor arm via a seventh attachment member; and
   the second end of the fourth extension arm is attached with the first end of the seventh motor arm, and the first end of the eighth motor arm via an eighth attachment member.

5. The aerial vehicle of claim 2, further comprising:
   a first motor attached to a second end of the first motor arm;
   a second motor attached to a second end of the second motor arm;
   a third motor attached to a second end of the third motor arm;
   a fourth motor attached to a second end of the fourth motor arm;
   a fifth motor attached to a second end of the fifth motor arm;
   a sixth motor attached to a second end of the sixth motor arm;
   a seventh motor attached to a second end of the seventh motor arm; and
   an eighth motor attached to a second end of the eighth motor arm.

6. An automated aerial delivery vehicle, comprising:
   a plurality of support arms;
   a plurality of extension arms;
   a plurality of motor arms; and
   a plurality of motors; wherein:
   a first end of a first support arm is attached with a first end of a second support arm, and a first end of a first extension arm; and
   a second end of the first extension arm is attached with a first end of a first motor arm, and a first end of a second motor arm.

7. The automated aerial delivery vehicle of claim 6, wherein:
   the first end of the first support arm is attached with the first end of the second support arm and the first end of the first extension arm via a first attachment member; and
   the second end of the first extension arm is attached with the first end of the first motor arm and the first end of the second motor arm is attached via a second attachment member.

8. The automated aerial delivery vehicle of claim 7, wherein:
   a first connection point of the first attachment member is attached to the first end of the first support arm;
   a second connection point of the first attachment member is attached to the first end of the second support arm;
   a third connection point of the first attachment member is attached to the first end of the first extension arm; and
   each of the first connection point of the first attachment member, the second connection point of the first attachment member, and the third connection point of the first attachment member are configured to attach to a support arm, an extension arm or a motor arm by fitting inside an end of the support arm, the extension arm, or the motor arm.

9. The automated aerial delivery vehicle of claim 7, wherein:

a first connection point of the first attachment member is positioned at approximately ninety degrees with respect to a second connection point of the first attachment member; and a third connection point of the first attachment member is positioned at approximately one-hundred thirty-five degrees with respect to the first connection point of the first attachment member and the second connection point of the first attachment member.

10. The automated aerial delivery vehicle of claim 7, wherein the first attachment member and the second attachment member are approximately a same size and shape.

11. The automated aerial delivery vehicle of claim 7, wherein:

the first support arm, the first attachment member, the first extension arm, the second attachment member and the first motor arm are hollow and configured to receive a wire that extends from a second end of the first motor arm.

12. The automated aerial delivery vehicle of claim 11, wherein:

the wire includes a separable junction configured to allow separation of the wire.

13. The automated aerial delivery vehicle of claim 12, wherein the separable junction is positioned near the second end of the first motor arm.

14. The automated aerial delivery vehicle of claim 12, wherein the wire includes a separable junction located at a connection point of the first attachment member.

15. The automated aerial delivery vehicle of claim 6, wherein:

each of the plurality of support arms are a same first length and interchangeable;

each of the plurality of motor arms are a same second length and interchangeable; and each of the plurality of extension arms are a same third length and interchangeable.

16. An aerial vehicle assembly, comprising:
a plurality of support arms;
a plurality of extension arms; and
a plurality of motor arms;
wherein:
 a first end of a first support arm is configured to be attached with a first end of a second support arm, and a first end of a first extension arm; and
 a second end of the first extension arm is configured to be attached with a first end of a first motor arm, and a first end of a second motor arm.

17. The aerial vehicle assembly of claim 16, further comprising:

a first attachment member configured to attach the second end of the first extension arm with the first end of the first motor arm and the first end of the second motor arm.

18. The aerial vehicle assembly of claim 16, wherein:

the first end of the first support arm is configured to be attached with the first end of the second support arm and the first end of the first extension arm via a second attachment member.

19. The aerial vehicle assembly of claim 16, further comprising:

an upper mounting plate configured to be attached to a motor and be positioned below a motor when attached to the motor; and a lower mounting plate configured to be attached to the motor and be positioned between the motor and the lower mounting plate when attached to the motor.

20. The aerial delivery assembly of claim 19, wherein:
the first motor arm is at least one of graphite, aluminum, carbon fiber, steel, titanium, or plastic;
the lower mounting plate is at least one of graphite, aluminum, carbon fiber, steel, titanium, or plastic; and
the upper mounting plate is at least one of graphite, aluminum, carbon fiber, steel, titanium, or plastic.

* * * * *